No. 711,960. Patented Oct. 28, 1902.
F. GRAY.
VALVE FOR FIRE EXTINGUISHER SYSTEMS.
(Application filed May 6, 1901.)
(No Model.) 2 Sheets—Sheet 1.
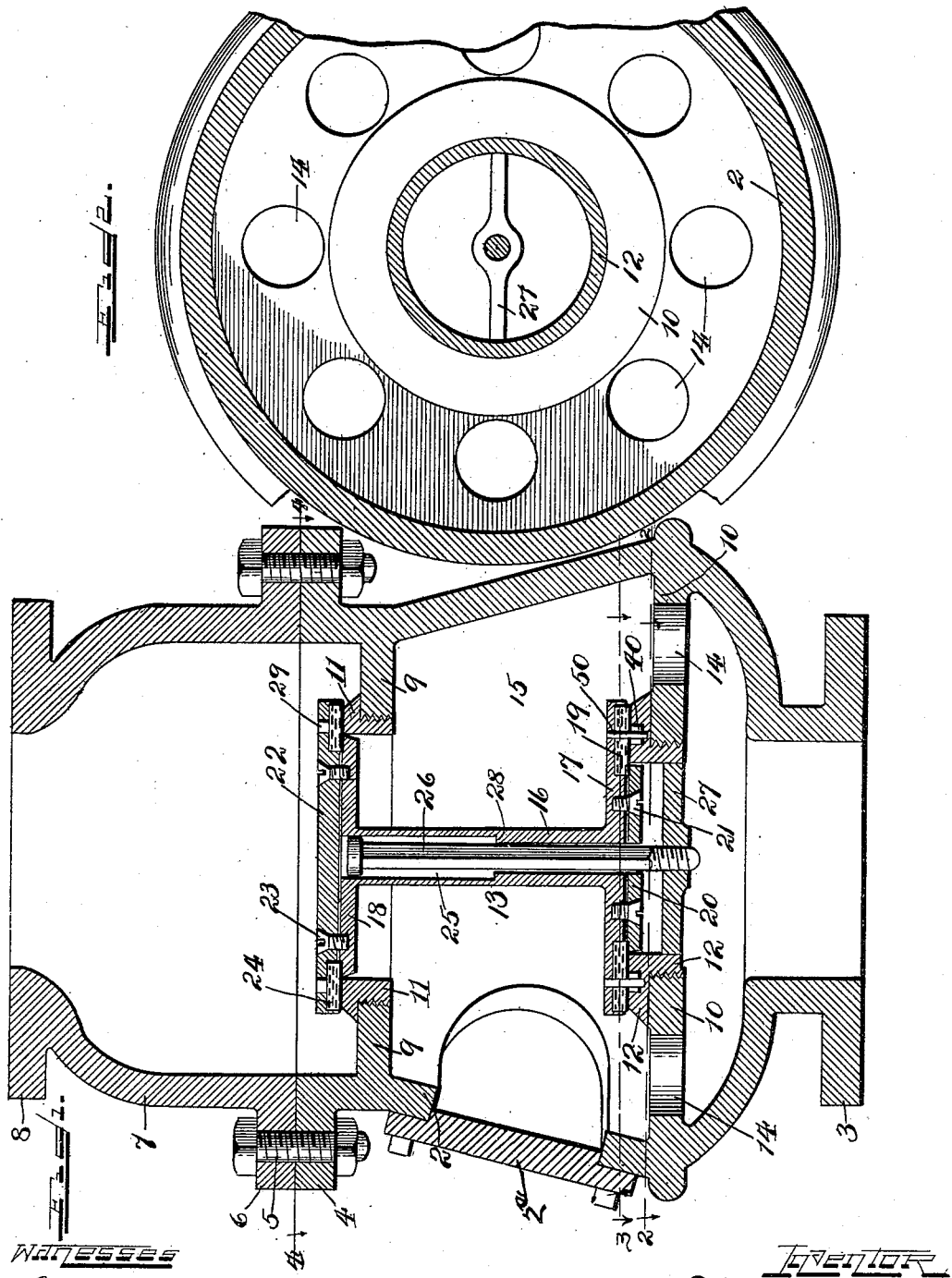

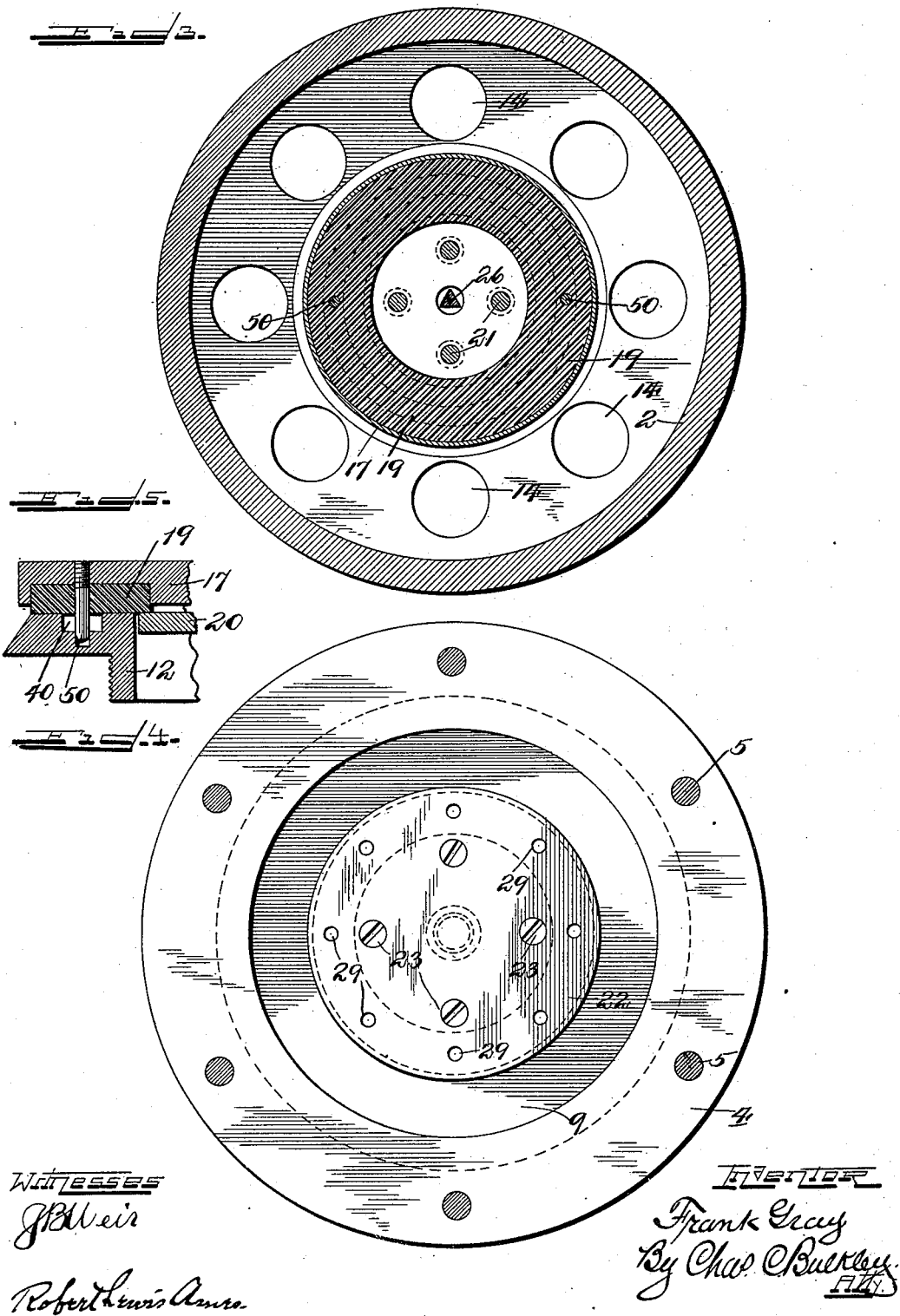

UNITED STATES PATENT OFFICE.

FRANK GRAY, OF CHICAGO, ILLINOIS.

VALVE FOR FIRE-EXTINGUISHER SYSTEMS.

SPECIFICATION forming part of Letters Patent No. 711,960, dated October 28, 1902.

Application filed May 6, 1901. Serial No. 58,899. (No model.)

*To all whom it may concern:*

Be it known that I, FRANK GRAY, a citizen of the United States of America, residing at Chicago, in the county of Cook and State of Illinois, have invented certain new and useful Improvements in Valves for Fire-Extinguisher Systems, of which the following is a specification.

My invention relates to improvements in automatic valves for controlling the supply of water or liquid to the sprinklers of fire-protective apparatus in the well-known dry-pipe systems or those systems in which the pipes of the systems are filled with compressed air or gas, a valve known as the "automatic" valve being interposed between the air on the one side and the water in the supply pipe or main on the other side.

A difficulty which exists in the present style of valve used, which is ordinarily of the differential type, is found in the reseating of the same by the rebound of the column of water when it reaches the sprinkler or end of the dry pipe and finds only a restricted outlet, as in the case of the operation of but one or a few sprinklers. This rebound results in so firmly reseating the automatic valve that it often fails to operate further, with the result that the sprinkler does not work and the system is of no value. Again, the valves in such systems are sometimes operated by the water-hammer in the pipes to the annoyance and inconvenience of all concerned and the disarrangement of the entire system.

My invention has for its object the provision of a valve of the class described, which shall remove the above-mentioned objections and embody many other advantages.

Further objects are the provision of such an apparatus of few and simple parts, one that will be simple and economical in construction, and one that is especially efficient in operation.

To the accomplishment of these and such other objects as may hereinafter appear, the invention comprises a casing inclosing a double-seat valve, one side of one of the valve-disks being exposed to the action of the compressed air in the pipes forming the dry-pipe system, and the other face of the same disk, as well as both faces of the other disk, being exposed to the pressure of the water. Under normal conditions the action of the water is insufficient to overcome that of the air; but upon the reduction of the air-pressure the water lifts the valve and the water finds its way into the dry pipes. On account of the circulation of the water over and about both sides of the lower valve-disk the same is not affected so readily by the water-hammer, since its force is exerted downward upon the valve as well as upward.

One means for preventing the reseating of the valve comprises an annular channel in the upper surface of the lower valve-seat, which is normally clean or empty, but which when the valve rises slightly fills with water and prevents the valve-disk from thereafter closely fitting its seat. Other features are devices for preventing too great a rise of the valve, elastic gaskets or washers carried by the valve-disks to bear upon the seats, means to admit the air-pressure to the upper side of the upper gasket or washer to firmly hold it upon the seat, and the use of steady-pins to aid in replacing the valve in exactly its former position after it has been once operated, as well as a simple and cheap construction throughout.

The invention further consists in the novel details of construction, parts, and combinations of parts hereinafter particularly described, and further pointed out in the appended claims, reference being had to the accompanying drawings, forming a part hereof, in which the same reference-numerals designate like parts throughout the several views, and in which—

Figure 1 is a sectional elevation through the center of the device. Fig. 2 is a sectional view on the line 2 2 of Fig. 1. Fig. 3 is a similar view on the line 3 3. Fig. 4 is a similar view on the line 4 4, and Fig. 5 is a detail sectional view showing more clearly the location and arrangement of the steady-pins in the seat-channel.

In the views the casing comprises the lower part 2, having the lower flange 3, adapted to be secured to the supply-pipe, and the upper flange 4, to which the bolts 5 secure the corresponding flange 6 of the bonnet or handhole cover 7, forming the upper part of the valve-casing, and which is likewise provided with a flange 8, adapted to be secured to the pipes of the sprinkler system.

The part 2 of the casing is considerably larger in diameter than the opening leading from the supply-pipe and is provided with internal cross-webs 9 and 10, on which are located the upper and lower valve-seats 11 and 12 of the double-seat valve 13, the upper seat and its open center being somewhat larger than the lower one. These seats, as shown, are threaded into the supporting-webs, the lower web having apertures 14 therethrough to provide free circulation of water at all times above it in the chamber 15 between the two webs or partitions 9 and 10. A handhole, provided with the cover 2ª, is made in the casing 2 and is designed to freely admit the several parts of the apparatus.

The double-seat valve 13 is composed of a stem 16, joining the lower disk 17 and the upper disk 18, the former having a shallow annular channel in its lower face for the reception of a resilient gasket ring or washer 19, of suitable material, as pure soft rubber, to form a yielding and at the same time an air and water tight bearing upon the seat 12. A disk 20 serves to clamp the said ring or washer in place and is itself secured by the screws 21. A disk 22 is fixed by screws 23 to the upper face of disk 18 and carries in an annular channel in its lower face a resilient gasket or washer 24, similar to the ring or washer 19 of the lower disk, which firmly seats upon the ring 11 and is held in place in the disk by the edge of disk 22.

Under ordinary conditions the compressed air is supposed to be on the upper side of the upper disk and is usually at twenty-five pounds pressure per square inch, though as much greater as is desired, or less may be used. The water may be under one hundred pounds pressure and owing to the apertures 14 circulates freely in the chamber 15 as well as below the lower disk 17. For an operative device then it is only necessary that the effective or resultant pressure of the air be greater than that of the water, so that when the air-pressure is reduced, as by the opening of a sprinkler-head by heat, the water will open the valve and pass therethrough to the sprinkler.

It will be observed that the water presses downward upon the top of the lower disk and upward on the lower sides of both disks. To cause the valve to rise, therefore, when the air-pressure is reduced, it is only necessary that the sum of the areas receiving upward pressure or the said lower faces be greater than that upon which downward water-pressure is exerted, or the top of the lower disk. That the same shall not rise under normal conditions it is further necessary that the aggregate pressure upon this excess area be not greater than the sum total of the air-pressure on the top of the valve.

As a means of preventing the valve from rising too far, the stem 16 is made hollow, with a larger bore 25 at its upper part and a headed bolt or pin 26, preferably three-cornered or three-sided, to prevent sticking by corrosion to the walls of the bore of the stem. The lower end of this pin is secured in any desired manner to a bar 27, extending across the valve-opening and fixed at its ends to the ring-seat 12. The valve can rise until the head of pin 26 strikes the interior shoulder 28 in the stem 16. Apertures 29 in the disk 22 above the resilient washer 24 admit the air to its upper surface normally, which is thus held firmly to the seat 11.

Water-hammer in the supply-pipe does not have as great a tendency in this form of valve to throw it off its seat as in other devices, since a large portion of its force is exerted downward upon the upper side of the lower disk, and thus neutralizes the attending upward force on the two disks.

When only one sprinkler of the system is operated, the rapidly-moving column of water is suddenly checked upon reaching the sprinkler and rebounds with such force as to reseat the valve with great force, and it is sometimes reseated, so that the pressure in the main or supply having but a limited area to bear against cannot lift the column of water which now rests upon the greater valve area formerly acted upon by the air. This results in a stoppage of the water-flow and renders the system inoperative. To overcome this difficulty, I provide the lower valve-seat with a depression or depressions, which preferably take the form of an annular channel 40, which is preferably rectangular in cross-section and which is empty and thoroughly cleaned out before the valve is seated thereon; but upon the least rise of the valve the channel fills with water, and when the valve is reseated by the rebound this water prevents it from firmly reseating, so that it will be immediately lifted again and the water will continue to flow. This action is aided by the capillary attraction between the metal and water, which causes the channel to tend to remain rounding full or at least even full at all times. The resilient washer 19 also aids in this action, since its tendency is to still more compress the water in the channel. A further possible effect and action of the channel is to prevent the entire squeezing out of all the water between the ring 19 and seat 12 upon the rebound or after the valve is once lifted, for it will be noticed that as soon as the valve is off its seat the water-pressure upon disk 17 is neutralized, and it therefore acts as a mere float or idle disk, while the effective area upon the valve will be that of the upper disk 18 of the diameter of the ring 11, and this would probably be sufficient to enable the main pressure to lift the valve and the water column on top of it after the rebound, providing, as assumed, that the channel prevents the effectual squeezing out of the water between the lower disk and its seat.

One main advantage of this construction is the increase of effective area for the pressure of the water as soon as the valve is lifted, since it is more surely and easily held away from its seat, which is also an advantage in lifting the valve and column of water after the rebound. This is apparent from Fig. 1, for, as shown, the effective area for upward pressure is the area of the under side of the upper disk plus that of the lower side of the lower disk minus the area of the upper side of the lower disk; but as soon as the water flows under the ring 19 the effective area becomes that of a circle equal to the diameter of the seat 11, for the pressure on both sides the ring 17 is neutralized, or, in other words, the lower disk may now be neglected, and the efficient area for upward pressure is largely increased.

The valve-disks, or only one of them, may be provided with steady-pins for the purpose of replacing the valve in exactly its former position to insure a more perfect fit of the disks upon their seats—as, for example, the pins 50 or equivalent projections in the lower disk 17 may fit within holes or depressions in the bottom of the channel 40, a convenient construction and arrangement for the same being that shown.

The valve, it will be seen, is free to turn upon the member 26 when it rises from its seat. Consequently the said pins will also serve to prevent the valve after rising and partially turning from reseating. In this way my invention contemplates as one feature a plurality of pins arranged to normally hold the valve against rotation relatively to the seat, but arranged to prevent a reseating of the valve after the latter has been raised by the pressure and allowed to partially rotate.

It is apparent that various changes in the form and proportions may be made and may even be required to suit special conditions of water and air pressure used or to suit unusual locations and that various modifications and alterations may be made in the invention and still come within its purview, and I do not, therefore, wish to be limited to the precise details shown and described; but What I do claim, and desire to secure by Letters Patent, is—

1. In a fire-extinguisher system, a valve-casing having liquid inlet and outlet openings, the said outlet-opening being adapted to communicate with the air-pressure, and two rigidly-connected valve-disks inclosed by said casing and arranged to open in the direction of outflow, the said casing being provided with suitable chambers and passages whereby the liquid-pressure is normally exerted upon both sides of one of said disks, the other disk being held normally seated by the pressure of the air.

2. In a dry-pipe fire-extinguisher system, a valve-casing having liquid inlet and outlet openings, the outlet-opening being adapted to communicate with the air-pressure, a plurality of valve-seats inclosed by said casing, a plurality of rigidly-connected valve-disks adapted to coöperate with said valve-seats in closing the passage through said valve-casing, said casing being constructed with suitable chambers and passages whereby the pressure is exerted normally upon both sides of one of said disks, and whereby the fluid-pressure operates to assist or augment the air-pressure in keeping the valve-disks seated.

3. In a dry-pipe fire-extinguisher system, a valve-casing provided with liquid inlet and outlet openings, the outlet-opening being adapted to communicate with the air-pressure, upper and lower valve-seats located within said valve-casing, rigidly-connected upper and lower valve-disks adapted to rest upon said valve-seats, the upper valve-disk being held seated by the air-pressure, and suitable passages for permitting the liquid-pressure to act on both the upper and lower surfaces of the lower valve-disk, the exposed surfaces of the two disks being so relatively proportioned as to permit the liquid-pressure to assist the air-pressure in keeping both disks normally seated until the air-pressure is reduced.

4. In a dry-pipe fire-extinguisher system, a valve-casing provided with liquid inlet and outlet openings, the outlet-opening communicating with the air-pressure, upper and lower valve-seats provided by webs formed on the interior of the valve-casing, the opening through the lower web being smaller than the opening through the upper web, a pair of upper and lower valve-disks rigidly connected and adapted to normally rest upon said valve-seats, the arrangement being such that the air-pressure exerted upon the upper disk tends to hold both disks normally seated, and a by-pass opening for permitting the liquid-pressure to act upon the opposing surfaces of the two valve-disks, the exposed surfaces of the disks when seated being so relatively proportioned that the liquid-pressure assists the air-pressure in keeping the valve normally closed until the air-pressure is reduced.

5. In a dry-pipe fire-extinguisher system, a valve-casing provided with liquid inlet and outlet openings, the outlet-opening being adapted to communicate with the air-pressure, a plurality of different-sized openings in said casing, valve-seats encircling said valve-openings, a plurality of rigidly-connected valve-disks adapted to bear normally upon said valve-seats, the air-pressure on the disk adjacent the liquid-outlet opening tending to hold all the disks normally seated, and suitable passages for permitting the liquid-pressure to act on both sides of one of said disks, so as to permit the liquid-pressure to assist the air-pressure in keeping all the disks normally seated until the air-pressure is reduced, said disks being moved in the direction of outflow to open said valve-openings when the air-pressure is reduced.

6. In a dry-pipe fire-extinguisher system, a valve-casing constructed with an annular valve-seat, said valve-seat being provided with an annular channel or recess, a valve-disk adapted to bear upon said valve-seat and to cover said annular channel or recess, and pins secured to said disk and adapted to extend into said channel or recess.

7. In a fire-extinguisher system, the combination of a valve-casing constructed with a valve-seat, said valve-seat being provided with a cavity or recess adapted to contain liquid, a valve adapted to rest upon said valve-seat and cover said recess or cavity, and pins secured to said valve and adapted to extend into said cavity or recess.

8. In a fire-extinguisher system, the combination of a valve-casing constructed with an annular valve-seat, said valve-seat being provided with an annular groove or channel, a valve adapted to normally rest upon said valve-seat, and vertically-disposed pins extending through said groove or channel.

9. The combination of a valve-casing, a plurality of rigidly-connected valve-disks, annular valve-seats upon which said disks normally rest, suitable passages for permitting fluid-pressure to act upon the opposing surfaces of said disks, the top of the upper disk being of greater area than the normally exposed lower surface of the lower disk, the top of the lower disk being of greater area than the normally exposed lower surface of the upper disk, and the normally exposed lower surface of the upper disk being of greater area than the normally exposed lower surface of the lower disk.

10. In a fire-extinguisher system, the combination of a casing constructed with a valve-seat, a valve-disk adapted to rest normally upon said seat, a member upon which said disk is free to turn when it rises from said seat, and a plurality of pins arranged to normally prevent relative rotation between said valve and valve-seat, said pins being adapted to prevent the valve after rising and partially rotating from reseating.

Signed by me at Chicago, Cook county, Illinois, this 3d day of May, 1901.

FRANK GRAY.

Witnesses:
  E. A. GARDINER,
  HARRY P. BAUMGARTNER.